(12) United States Patent
Lee

(10) Patent No.: US 11,976,998 B2
(45) Date of Patent: May 7, 2024

(54) DEVICE AND METHOD FOR CONTROLLING BALANCE OF URBAN AIR MOBILITY

(71) Applicants: Hyundai Motor Company, Seoul (KR); Kia Corporation, Seoul (KR)

(72) Inventor: Tae Ho Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 468 days.

(21) Appl. No.: 17/339,453

(22) Filed: Jun. 4, 2021

(65) Prior Publication Data
US 2022/0178780 A1 Jun. 9, 2022

(30) Foreign Application Priority Data
Dec. 8, 2020 (KR) ............ 10-2020-0170855

(51) Int. Cl.
*G01M 1/12* (2006.01)
*B64D 11/06* (2006.01)
*B64D 25/04* (2006.01)

(52) U.S. Cl.
CPC ......... *G01M 1/127* (2013.01); *B64D 11/0602* (2014.12); *B64D 11/0639* (2014.12); *B64D 25/04* (2013.01)

(58) Field of Classification Search
CPC .............. G01M 1/127; B64D 11/0602; B64D 11/0639; B64D 25/04; B64D 31/06; B64D 31/00; B64D 11/064; B64D 27/24; B64C 17/02; B64C 17/00; B64C 15/02; G06Q 50/30
See application file for complete search history.

(56) References Cited

U.S. PATENT DOCUMENTS

| | | | | |
|---|---|---|---|---|
| 2018/0354617 A1* | 12/2018 | Frolov | .................. | B64C 17/08 |
| 2019/0202561 A1* | 7/2019 | Weekes | .................. | B64D 1/22 |
| 2020/0355570 A1* | 11/2020 | Priest | .................. | G08G 5/0039 |
| 2021/0080946 A1* | 3/2021 | Villa | .................. | B64C 39/024 |

* cited by examiner

Primary Examiner — Mussa A Shaawat
(74) Attorney, Agent, or Firm — MORGAN, LEWIS & BOCKIUS LLP

(57) ABSTRACT

A device for controlling a balance of an urban air mobility, may include a receiver configured to receive occupant information related to the urban air mobility from a cloud server; and a controller configured to control the balance of the urban air mobility according to the received occupant information.

16 Claims, 7 Drawing Sheets

FIG. 3B

DEVICE AND METHOD FOR CONTROLLING BALANCE OF URBAN AIR MOBILITY

CROSS-REFERENCE TO RELATED APPLICATION

The present application claims priority to Korean Patent Application No. 10-2020-0170855, filed on Dec. 8, 2020, the entire contents of which is incorporated herein for all purposes by this reference.

BACKGROUND OF THE INVENTION

Field of the Invention

The present invention relates to a technology for controlling a balance of an urban air mobility based on occupant information.

Description of Related Art

In recent years, an urban air mobility (UAM) has been developed as an air transportation system for solving traffic congestion on a road. Such urban air mobility, which is means of transportation that may safely transport an occupant to a specified place, may be used at a lower cost compared to a helicopter because a separate runway is not required as vertical take-off and landing are possible and there is no demand for a pilot as autonomous travel is possible.

Because such urban air mobility flies while floating in air, a technology of balancing is more important than anything else.

Because a conventional urban air mobility flies without considering a body weight of an occupant, when a weight is biased to one of forward/rearward/left/right sides of the urban air mobility, safe flight is difficult as the balancing is not able to be performed normally.

The matters described in this background are written to enhance an understanding of the background of the invention, and may include matters other than the related art already known to those of ordinary skill in the field to which this technology belongs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a device and a method for controlling a balance of an urban air mobility that balance the urban air mobility to enable safe flight by collecting occupant information in various schemes, allocating a seat in the urban air mobility to each occupant based on the collected occupant information, adjusting a location of the seat (moving the seat in forward/rearward/left/right directions) in the urban air mobility based on the collected occupant information, or adjusting an output of a driving motor mounted in the urban air mobility based on the collected occupant information.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a device configured for controlling a balance of an urban air mobility includes a receiver that receives occupant information related to the urban air mobility from a cloud server, and a controller that is configured to control the balance of the urban air mobility according to the received occupant information.

In various exemplary embodiments of the present invention, the controller may allocate a seat in the urban air mobility to each occupant according to the occupant information to secure the balance during flight of the urban air mobility.

In various exemplary embodiments of the present invention, the controller may allocate the seat such that a weight ratio between occupants on a left side and occupants on a right side in the urban air mobility becomes to be equal to or less than a threshold, and a weight ratio between occupants on a front side and occupants on a rear side in the urban air mobility becomes to be equal to or less than the threshold.

In various exemplary embodiments of the present invention, the controller may adjust a location of a seat in the urban air mobility in forward, rearward, left, and right directions of the urban air mobility according to the occupant information to secure the balance during flight of the urban air mobility.

In various exemplary embodiments of the present invention, the controller may move a seat of an occupant whose body weight exceeds a reference value toward a vertical center line and move a seat of an occupant whose body weight does not exceed the reference value in a direction to be away from the vertical center line to balance weights of occupants on left and right sides in the urban air mobility.

In various exemplary embodiments of the present invention, the controller may move a seat of an occupant whose body weight exceeds a reference value toward a horizontal center line and move a seat of an occupant whose body weight does not exceed the reference value in a direction to be away from the horizontal center line to balance weights of occupants on front and rear sides in the urban air mobility.

In various exemplary embodiments of the present invention, the controller may adjust an output of each driving motor mounted in the urban air mobility according to the occupant information to secure the balance during flight of the urban air mobility.

In various exemplary embodiments of the present invention, the controller may increase an output of a driving motor located on a side where a weight of occupants is heavier to balance weights of occupants on left and right sides in the urban air mobility.

In various exemplary embodiments of the present invention, the controller may increase an output of a driving motor located on a side where a weight of occupants is heavier to balance weights of occupants on front and rear sides in the urban air mobility.

According to various aspects of the present invention, a method for controlling a balance of an urban air mobility includes receiving, by a receiver, occupant information related to the urban air mobility from a cloud server, and controlling, by a controller, the balance of the urban air mobility according to the received occupant information.

In various exemplary embodiments of the present invention, the controlling of the balance of the urban air mobility may include allocating a seat in the urban air mobility to each occupant according to the occupant information to secure the balance during flight of the urban air mobility.

In various exemplary embodiments of the present invention, the allocating of the seat in the urban air mobility may include allocating the seat such that a weight ratio between occupants on a left side and occupants on a right side in the urban air mobility becomes to be equal to or less than a threshold, and a weight ratio between occupants on a front side and occupants on a rear side in the urban air mobility becomes to be equal to or less than the threshold.

In various exemplary embodiments of the present invention, the controlling of the balance of the urban air mobility may include adjusting a location of a seat in the urban air mobility in forward, rearward, left, and right directions of the urban air mobility according to the occupant information to secure the balance during flight of the urban air mobility.

In various exemplary embodiments of the present invention, the adjusting of the location of the seat in the urban air mobility in the forward, rearward, left, and right directions may include moving a seat of an occupant whose body weight exceeds a reference value toward a vertical center line and moving a seat of an occupant whose body weight does not exceed the reference value in a direction to be away from the vertical center line to balance weights of occupants on left and right sides in the urban air mobility, and moving a seat of an occupant whose body weight exceeds the reference value toward a horizontal center line and moving a seat of an occupant whose body weight does not exceed the reference value in a direction to be away from the horizontal center line to balance weights of occupants on front and rear sides in the urban air mobility.

In various exemplary embodiments of the present invention, the controlling of the balance of the urban air mobility may include adjusting an output of each driving motor mounted in the urban air mobility according to the occupant information to secure the balance during flight of the urban air mobility.

In various exemplary embodiments of the present invention, the adjusting of the output of each driving motor mounted in the urban air mobility may include increasing an output of a driving motor located on a side where a weight of occupants is heavier to balance weights of occupants on left and right sides in the urban air mobility, and increasing an output of a driving motor located on a side where a weight of occupants is heavier to balance weights of occupants on front and rear sides in the urban air mobility.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3B is a second exemplary view exemplarily illustrating an operation of a controller provided in a device configured for controlling a balance of an urban air mobility according to various exemplary embodiments of the present invention, which illustrates a process of adjusting a location of a seat in the urban air mobility in forward/rearward directions based on occupant information;

Figure 1:
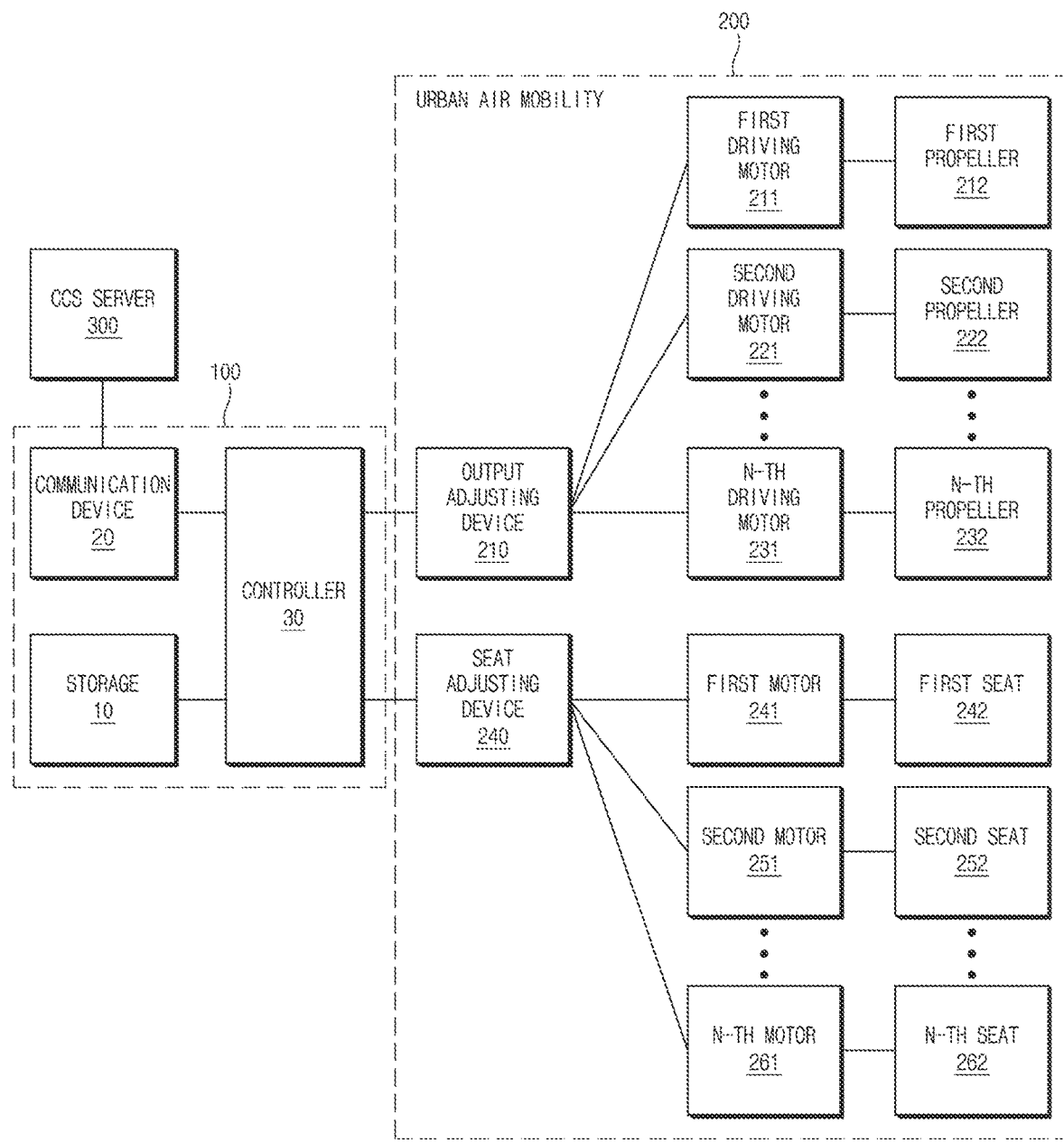
FIG. 1 is a block diagram of a device configured for controlling a balance of an urban air mobility according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, may be interpreted as having a meaning that is consistent with their meaning in the context of the relevant art and will not be interpreted in an idealized or overly formal sense unless so defined herein.

FIG. 1 is a block diagram of a device configured for controlling a balance of an urban air mobility according to various exemplary embodiments of the present invention.

As shown in FIG. 1, a device 100 for controlling a balance of an urban air mobility according to various exemplary embodiments of the present invention may include storage 10, a communication device 20, and a controller 30. In the present connection, components may be coupled to each other to be implemented as one component, or some components may be omitted depending on a scheme for implementing the device 100 for controlling the balance of the urban air mobility according to various exemplary embodiments of the present invention.

In the present connection, an urban air mobility 200 may include an output adjusting device 210 and a seat adjusting device 240. The output adjusting device 210 may adjust outputs of a first driving motor 211, a second driving motor 221, and an n-th driving motor 231 to provide power to the urban air mobility 200. The seat adjusting device 240 may control a first motor 241, a second motor 251, and an n-th motor 261 to adjust a location of a seat in the urban air mobility 200. In the present connection, the first driving motor 211 may drive a first propeller 212, the second driving motor 221 may drive a second propeller 222, and the n-th driving motor 231 may drive an n-th propeller 232. Furthermore, the first motor 241 may adjust a location of a first seat 242, the second motor 251 may adjust a location of the second seat 252, and the n-th motor 261 may adjust a location of an n-th seat 262.

Furthermore, a connected car service (CCS) server 300, which is a cloud server, may collect and manage personal information related to a user.

Each of the components will be described. First, the storage 10 may store various logics, algorithms, and programs required in a process of controlling a balance (a weight balance) of the urban air mobility 200 based on occupant information acquired from the CCS server 300. In the present connection, the occupant information may include, for example, a height, a body weight, an age, and the like.

The storage 10 may store various logics, algorithms, and programs required in a process of allocating a seat in the urban air mobility 200 to each occupant based on the occupant information acquired from the CCS server 300 to secure the balance during flight of the urban air mobility 200.

The storage 10 may store various logics, algorithms, and programs required in a process of controlling the seat adjusting device 240 to adjust the location of the seat in the urban air mobility 200 in forward/rearward/left/right directions based on the occupant information acquired from the connected car service (CCS) server 300 to secure the balance during the flight of the urban air mobility 200.

The storage 10 may store various logics, algorithms, and programs required in a process of controlling the output adjusting device 210 to adjust the output of each of the driving motors 211, 221, and 231 disposed in the urban air mobility 200 based on the occupant information acquired from the CCS server 300 to secure the balance during the flight of the urban air mobility 200.

Such storage 10 may include at least one type of recording media (storage media) of a memory of a flash memory type, a hard disk type, a micro type, a card type (e.g., a secure digital card (SD card) or an eXtream digital card (XD card)), and the like, or a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The communication device 20 may receive the occupant information from the CCS server 300. In the present connection, the communication device 20 may acquire the occupant information from a separate server.

Such first communication device 20 may include at least one of a mobile communication module, a wireless Internet module, and/or a short-range communication module as a module that transmits and receives data through a network.

The mobile communication module may communicate with the CCS server 300 through a mobile communication network built based on technical standards or communication schemes for mobile communication (e.g., a global system for mobile communication (GSM), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), a long term evolution-advanced (LTEA), and the like), a 4th generation mobile telecommunication (4G), and a 5th generation mobile telecommunication (5G).

The wireless Internet module, which is a module for wireless Internet access, may communicate with the CCS server 300 through a wireless LAN (WLAN), a wireless-fidelity (Wi-Fi), a wireless fidelity (Wi-Fi) Direct, a digital living network alliance (DLNA), a wireless broadband (Wi-Bro), a Worldwide Interoperability for Microwave Access (WiMAX), a high speed downlink packet access (HSDPA), a high speed uplink packet access (HSUPA), a long term evolution (LTE), a long term evolution-advanced (LTE-A), and the like.

The short-range communication module may support short-range communication using at least one of technologies of a Bluetooth™, a radio frequency identification (RFID), an infrared data association (IrDA), an ultra wide-band (UWB), a ZigBee, a near field communication (NFC), and/or a wireless universal serial bus (Wireless USB).

The controller 30 may perform overall control such that each of the components may normally perform a function thereof. Such controller 30 may be implemented in a form of hardware, software, or a combination of the hardware and the software. The controller 30 may be implemented as a microprocessor, but may not be limited thereto.

The controller 30 may perform various controls required in a process of controlling the balance of the urban air mobility 200 based on the occupant information acquired from the connected vehicle service (CCS) server 300.

Furthermore, the controller 30 may perform various controls required in a process of allocating the seat in the urban air mobility 200 to each occupant based on the occupant information acquired from the connected car service (CCS) server 300 to secure the balance during the flight of the urban air mobility 200.

Furthermore, the controller 30 may control the seat adjusting device 240 to adjust the location of the seat in the urban air mobility 200 in the forward, rearward, left, and right directions based on the occupant information acquired from the connected car service (CCS) server 300 to secure the balance during the flight of the urban air mobility 200.

Furthermore, the controller 30 may control the output adjusting device 210 to adjust the output of each of the driving motors 211, 221, and 231 disposed in the urban air mobility 200 based on the occupant information acquired from the connected vehicle service (CCS) server 300 to secure the balance during the flight of the urban air mobility 200.

Hereinafter, the operation of the controller 30 will be described in detail with reference to FIG. 2, FIG. 3 and FIG. 4.

Figure 2:
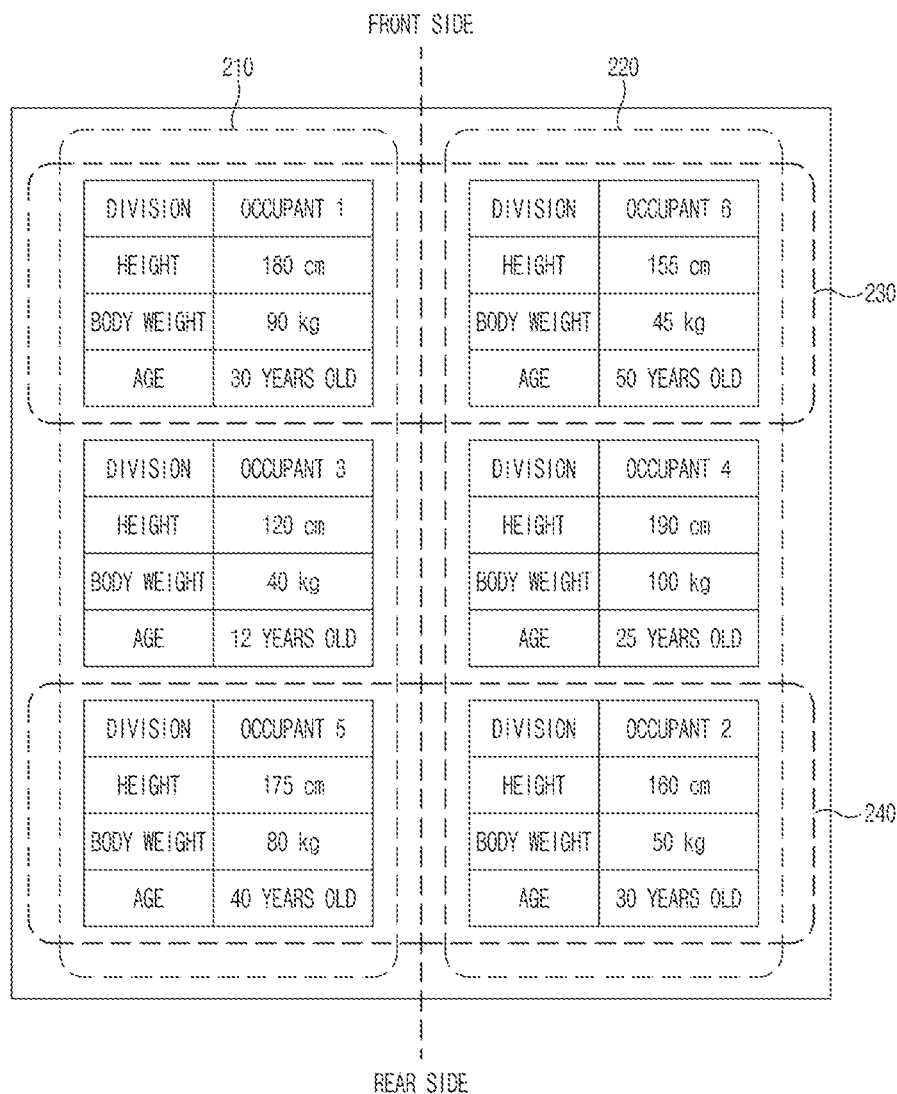
FIG. 2 is a first exemplary view exemplarily illustrating an operation of a controller provided in a device configured for controlling a balance of an urban air mobility according to various exemplary embodiments of the present invention.

FIG. 2 is a first exemplary view exemplarily illustrating an operation of a controller provided in a device configured for controlling a balance of an urban air mobility according to various exemplary embodiments of the present invention, which illustrates the process of allocating the seat in the urban air mobility 200 to each occupant based on the occupant information. In the present connection, the allocating of the seat in the urban air mobility 200 to each occupant means determining of an occupant to sit in each seat.

As shown in FIG. 2, the number of occupants of the urban air mobility 200 is, for example, a total of 6. An occupant 1 is 180 cm tall, weighs 90 kg, and is 30 years old, an occupant 2 is 160 cm tall, weighs 50 kg, and is 30 years, an occupant 3 is 120 cm tall, weighs 40 kg, and is 12 years old, an occupant 4 is 190 cm tall, weighs 100 kg, and is 25 years old, an occupant 5 is 175 cm tall, weighs 80 kg, and is 40 years old, and an occupant 6 is 155 cm tall, weighs 45 kg, and is 50 years old.

The controller 30 may allocate the seats for the 6 occupants to secure the balance during the flight of the urban air mobility 200. That is, the controller 30 may allocate the occupant 1 to a top left seat, allocate the occupant 3 to a left center seat, allocate the occupant 5 to a bottom left seat, allocate the occupant 6 to a top right seat, allocate the occupant 4 to a right center seat, and allocate the occupant 2 to a bottom right seat. In this connection, a center of gravity of the urban air mobility 200 itself is assumed to be located at a center of a boarding space, but is not necessarily limited thereto. That is, the controller 30 may allocate the seat to the occupant in consideration of the center of gravity of the urban air mobility 200 itself regardless of whether the center of gravity of the urban air mobility 200 itself is at a front side or a rear side, securing the balance during the flight of the urban air mobility 200.

Thus, a weight of the occupants on a left side 210 in the urban air mobility 200 becomes 210 kg (90+40+80), and a weight of the occupants on a right side 220 becomes 195 kg (45+100+50). In the present connection, because a weight difference between the left side 210 and the right side 220 in the urban air mobility 200 is included within an error range (e.g., 20 kg), the controller 30 may determine that the urban air mobility 200 is balanced in the left/right direction thereof.

Furthermore, a weight of the occupants on a front side 230 in the urban air mobility 200 becomes 135 kg (90+45), and a weight of the occupants on a rear side 240 becomes 130 kg (80+50). In the present connection, because a weight difference between the front side 230 and the rear side 240 in the urban air mobility 200 is included within an error range (e.g., 20 kg), the controller 30 may determine that the urban air mobility 200 is balanced in the forward/rearward directions.

The controller 30 may allocate the seat to each occupant such that a weight ratio between the weight of the occupants on the left side 210 and the weight of the occupants on the right side 220 becomes to be equal to or less than a threshold, and a weight ratio between the weight of the occupants on the front side 230 and the weight of the occupants on the rear side 240 becomes to be equal to or less than the threshold.

Figure 3A:
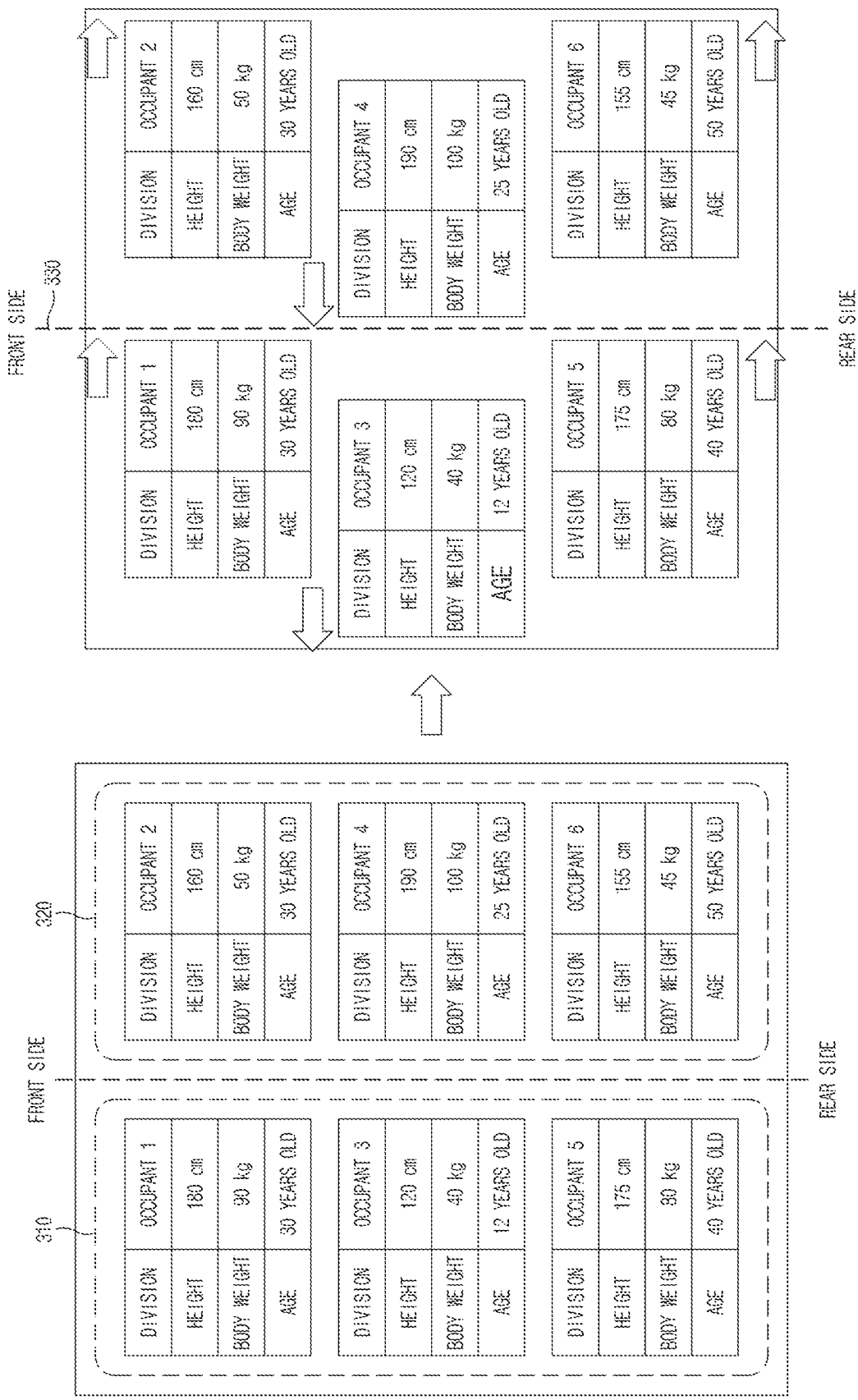
FIG. 3A is a second exemplary view exemplarily illustrating an operation of a controller provided in a device configured for controlling a balance of an urban air mobility according to various exemplary embodiments of the present invention, which illustrates a process of adjusting a location of a seat in the urban air mobility in left/right directions based on occupant information.

FIG. 3A is a second exemplary view exemplarily illustrating an operation of a controller provided in a device configured for controlling a balance of an urban air mobility according to various exemplary embodiments of the present invention, which illustrates the process of adjusting the location of the seat in the urban air mobility 200 in the left/right directions based on the occupant information.

As shown in FIG. 3A, the occupant 1 is allocated to the top left seat, the occupant 3 is allocated to the left center seat, the occupant 5 is allocated to the bottom left seat, the occupant 2 is allocated to the top right seat, the occupant 4 is allocated to the right center seat, and the occupant 6 is allocated to the bottom right seat. Thus, a weight of the occupants on a left side 310 of the urban air mobility 200 becomes 210 kg, and a weight of the occupants on a right side 320 becomes 195 kg.

The controller 30 may move the seat of the occupant 1 in a direction of a vertical center line 330, move the seat of the occupant 2 in the right direction to be away from the vertical center line 330, move the seat of the occupant 3 in a left direction to be away from the vertical center line 300, move the seat of the occupant 4 in the direction of the vertical center line 330, move the seat of the occupant 5 in the direction of the vertical center line 330, and move the seat of the occupant 6 in the right direction to be away from the vertical center line 330 to balance the weights of the occupants on the left/right sides in the urban air mobility 200.

The controller 30 may move a seat of an occupant whose body weight exceeds a reference value (e.g., 70 kg) in the direction of the vertical center line 330, and move a seat of an occupant whose body weight does not exceed the reference value in the left or right direction to be away from the vertical center line 330.

Figure 3B:
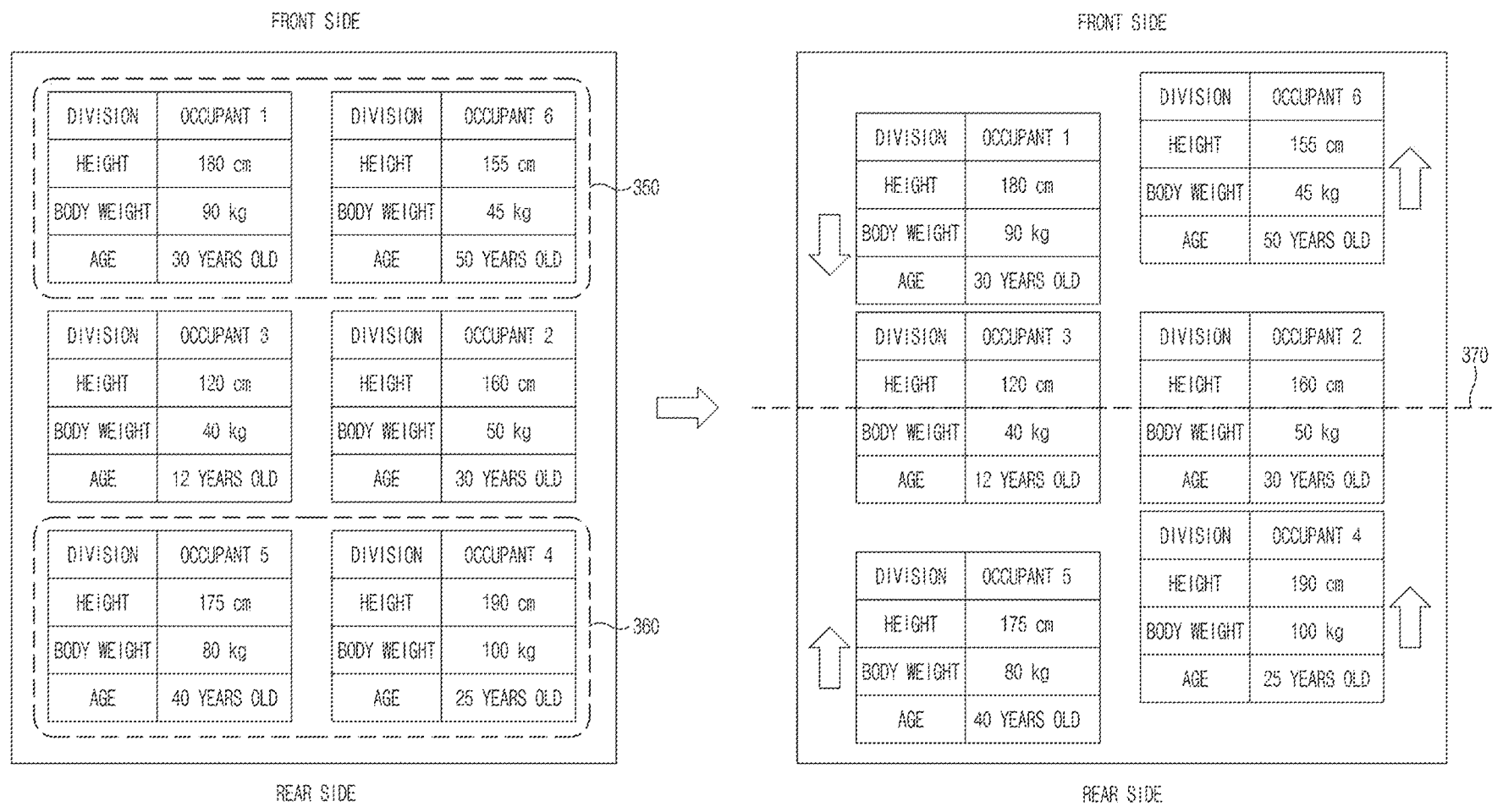

FIG. 3B is a second exemplary view exemplarily illustrating an operation of a controller provided in a device configured for controlling a balance of an urban air mobility according to various exemplary embodiments of the present invention, which illustrates the process of adjusting the location of the seat in the urban air mobility 200 in the forward/rearward directions based on the occupant information.

As shown in FIG. 3B, the occupant 1 is allocated to the top left seat, the occupant 3 is allocated to the left center seat, the occupant 5 is allocated to the bottom left seat, the occupant 6 is allocated to the top right seat, the occupant 2 is allocated to the right center seat, and the occupant 4 is allocated to the bottom right seat. Thus, a weight of the occupants on a front side 350 of the urban air mobility 200 becomes 135 kg, and a weight of the occupants on a rear side 360 becomes 180 kg.

The controller 30 may move the seat of the occupant 1 in a direction of a horizontal center line 370, move the seat of the occupant 5 in the direction of the horizontal center line 370, move the seat of the occupant 6 in a forward direction to be away from the horizontal center line 370, and move the seat of the occupant 4 in the direction of the horizontal center line 370 to balance the weights of the occupants on the front and rear sides in the urban air mobility 200.

The controller 30 may move the seat of the occupant whose body weight exceeds the reference value (e.g., 70 kg)

in the direction of the horizontal center line 370, and move the seat of the occupant whose body weight does not exceed the reference value in the forward direction or a rearward direction to be away from the horizontal center line 370.

The case in which the controller 30 moves the seat in the left/right directions has been described in FIG. 3A and the case in which the controller 30 moves the seat in the forward/rearward directions has been described in FIG. 3B to help understanding, but the controller 30 may be implemented to move the seat in the forward, rearward, left, and right directions when being applied to the actual urban air mobility 200. Furthermore, the process of moving the seat in the forward, rearward, left, and right directions shown in FIG. 3A and FIG. 3B may be additionally performed after the seat allocation process of FIG. 2.

Figure 4:
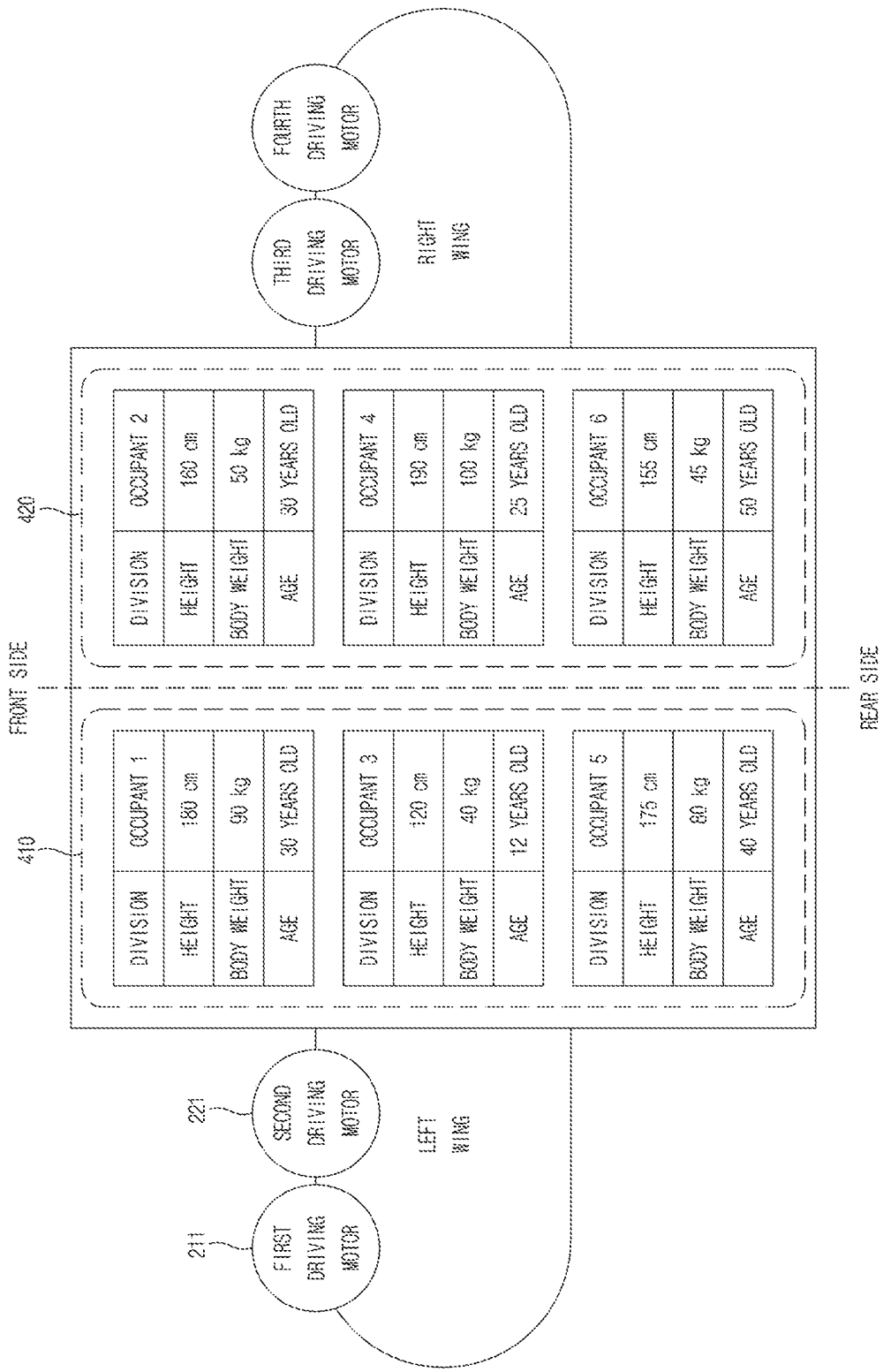
FIG. 4 is a third exemplary view exemplarily illustrating an operation of a controller provided in a device configured for controlling a balance of an urban air mobility according to various exemplary embodiments of the present invention.

FIG. 4 is a third exemplary view exemplarily illustrating an operation of a controller provided in a device configured for controlling a balance of an urban air mobility according to various exemplary embodiments of the present invention, which illustrates the process of adjusting the outputs of the driving motors 211, 221, and 231 disposed in the urban air mobility 200 based on the occupant information.

As shown in FIG. 4, the occupant 1 is allocated to the top left seat, the occupant 3 is allocated to the left center seat, the occupant 5 is allocated to the bottom left seat, the occupant 2 is allocated to the top right seat, the occupant 4 is allocated to the right center seat, and the occupant 6 is allocated to the bottom right seat. Thus, a weight of the occupants on a left side 410 of the urban air mobility 200 becomes 210 kg, and a weight of the occupants on a right side 420 becomes 195 kg.

The controller 30 may control the output adjusting device 210 to increase the outputs of the first driving motor 211 and the second driving motor 221 located on a left wing of the urban air mobility 200 to balance the weights of the occupants on the left/right sides of the urban air mobility 200.

The controller 30 may control the output adjusting device 210 to increase an output of a driving motor located on the front side of the urban air mobility 200 when the weights of the occupants on the front side of the urban air mobility 200 is heavier than the weights of the occupants on the rear side by an amount equal to or greater than the threshold.

The controller 30 may control the output of each driving motor to balance the weights of the occupants on the front/rear/left/right sides of the urban air mobility 200.

Figure 5:
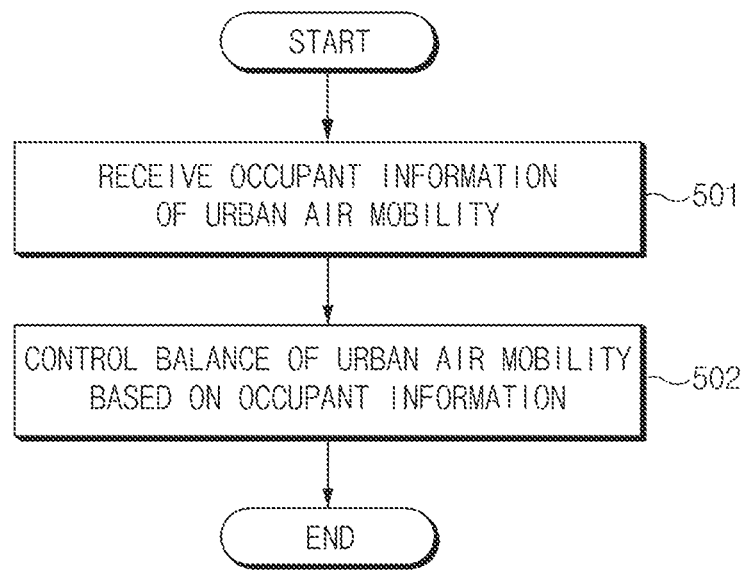
FIG. 5 is a flowchart for a method for controlling a balance of an urban air mobility according to various exemplary embodiments of the present invention.

FIG. 5 is a flowchart for a method for controlling a balance of an urban air mobility according to various exemplary embodiments of the present invention.

First, the communication device 20 may receive the occupant information related to the urban air mobility 200 from the cloud server 300 (501). That is, the controller 30 may acquire the occupant information related to the urban air mobility 200 from the cloud server 300 through the communication device 20.

Thereafter, the controller 30 may control the balance of the urban air mobility 200 based on the received occupant information (502). That is, the controller 30 may allocate the seat in the urban air mobility to each occupant based on the collected occupant information, adjust the location of the seat (move the seat in the forward/rearward/left/right directions) in the urban air mobility based on the collected occupant information, or adjust the output of the driving motor mounted in the urban air mobility based on the collected occupant information, securing the weight balance during the flight of the urban air mobility 200.

Figure 6:
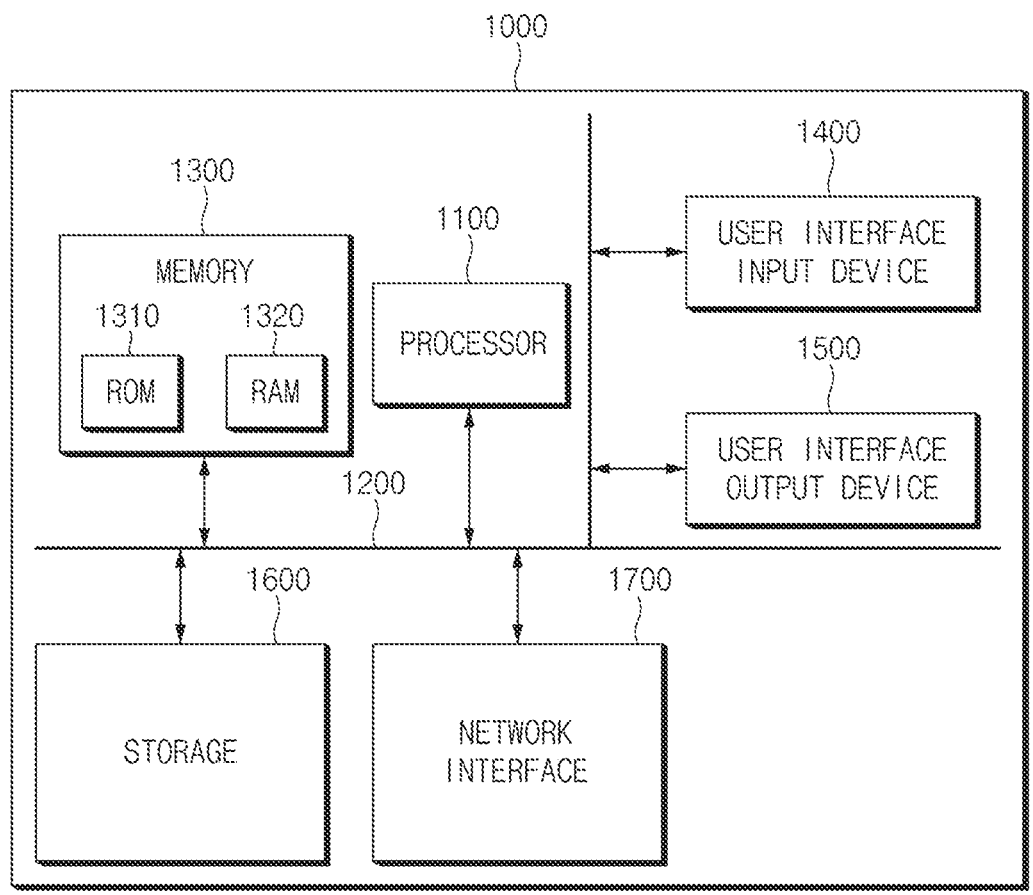
FIG. 6 is a block diagram illustrating a computing system for executing a method for controlling a balance of an urban air mobility according to various exemplary embodiments of the present invention.

FIG. 6 is a block diagram illustrating a computing system for executing a method for controlling a balance of an urban air mobility according to various exemplary embodiments of the present invention.

Referring to FIG. 6, the method for controlling the balance of the urban air mobility according to various exemplary embodiments of the present invention described above may also be implemented using a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present invention, and various modifications and changes may be made by those skilled in the art without departing from the essential characteristics of the present invention.

Therefore, the exemplary embodiments included in various exemplary embodiments of the present invention are not intended to limit the technical idea of the present invention but to illustrate the present invention, and the scope of the technical idea of the present invention is not limited by the embodiments. The scope of the present invention may be construed as being covered by the scope of the appended claims, and all technical ideas falling within the scope of the claims may be construed as being included in the scope of the present invention.

The device and the method for controlling the balance of the urban air mobility according to various exemplary embodiments of the present invention as described above may balance the urban air mobility to enable the safe flight by collecting the occupant information in the various schemes, allocating the seat in the urban air mobility to each occupant based on the collected occupant information, adjusting the location of the seat (moving the seat in the forward/rearward/left/right directions) in the urban air mobility based on the collected occupant information, or adjusting the output of the driving motor mounted in the urban air mobility based on the collected occupant information.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A device for controlling a balance of an urban air mobility, the device comprising:
   a receiver configured to receive occupant information related to the urban air mobility from a cloud server; and
   a controller configured to control the balance of the urban air mobility according to the received occupant information,
   wherein the controller is configured to adjust a location of a seat in the urban air mobility in forward, rearward, left, and right directions of the urban air mobility according to the occupant information to secure the balance during flight of the urban air mobility.

2. The device of claim 1, wherein the controller is configured to allocate the seat in the urban air mobility to each occupant according to the occupant information to secure the balance during flight of the urban air mobility.

3. The device of claim 2, wherein the controller is configured to allocate the seat so that a weight ratio between occupants on a left side and occupants on a right side in the urban air mobility becomes to be equal to or less than a first threshold, and a weight ratio between occupants on a front side and occupants on a rear side in the urban air mobility becomes to be equal to or less than a second threshold.

4. The device of claim 3, wherein the first threshold is equal to the second threshold.

5. The device of claim 1, wherein the controller is configured to move a seat of an occupant whose body weight exceeds a reference value toward a vertical center line and move a seat of an occupant whose body weight does not exceed the reference value in a direction to be away from the vertical center line to balance weights of occupants on left and right sides in the urban air mobility.

6. The device of claim 1, wherein the controller is configured to move a seat of an occupant whose body weight exceeds a reference value toward a horizontal center line and move a seat of an occupant whose body weight does not exceed the reference value in a direction to be away from the horizontal center line to balance weights of occupants on front and rear sides in the urban air mobility.

7. The device of claim 1, wherein the controller is configured to adjust an output of each driving motor mounted in the urban air mobility according to the occupant information to secure the balance during flight of the urban air mobility.

8. The device of claim 7, wherein the controller is configured to increase an output of a driving motor located on a side where a weight of occupants is heavier to balance weights of occupants on left and right sides in the urban air mobility.

9. The device of claim 7, wherein the controller is configured to increase an output of a driving motor located on a side where a weight of occupants is heavier to balance weights of occupants on front and rear sides in the urban air mobility.

10. A method for controlling a balance of an urban air mobility, the method comprising:
    receiving, by a receiver, occupant information related to the urban air mobility from a cloud server; and
    controlling, by a controller, the balance of the urban air mobility according to the received occupant information,
    wherein the controlling of the balance of the urban air mobility includes:
    adjusting a location of a seat in the urban air mobility in forward, rearward, left, and right directions of the urban air mobility according to the occupant information to secure the balance during flight of the urban air mobility.

11. The method of claim 10, wherein the controlling of the balance of the urban air mobility includes:
    allocating the seat in the urban air mobility to each occupant according to the occupant information to secure the balance during flight of the urban air mobility.

12. The method of claim 11, wherein the allocating of the seat in the urban air mobility includes:
    allocating the seat so that a weight ratio between occupants on a left side and occupants on a right side in the urban air mobility becomes to be equal to or less than a first threshold, and a weight ratio between occupants on a front side and occupants on a rear side in the urban air mobility becomes to be equal to or less than a second threshold.

13. The method of claim 12, wherein the first threshold is equal to the second threshold.

14. The method of claim 10, wherein the adjusting of the location of the seat in the urban air mobility in the forward, rearward, left, and right directions includes:
    moving a seat of an occupant whose body weight exceeds a reference value toward a vertical center line and moving a seat of an occupant whose body weight does not exceed the reference value in a direction to be away from the vertical center line to balance weights of occupants on left and right sides in the urban air mobility; and
    moving a seat of an occupant whose body weight exceeds the reference value toward a horizontal center line and moving a seat of an occupant whose body weight does not exceed the reference value in a direction to be away from the horizontal center line to balance weights of occupants on front and rear sides in the urban air mobility.

15. The method of claim 10, wherein the controlling of the balance of the urban air mobility includes:
    adjusting an output of each driving motor mounted in the urban air mobility according to the occupant information to secure the balance during flight of the urban air mobility.

16. The method of claim 15, wherein the adjusting of the output of each driving motor mounted in the urban air mobility includes:
- increasing an output of a driving motor located on a side where a weight of occupants is heavier to balance weights of occupants on left and right sides in the urban air mobility; and
- increasing an output of a driving motor located on a side where a weight of occupants is heavier to balance weights of occupants on front and rear sides in the urban air mobility.

\* \* \* \* \*